Feb. 18, 1941.    N. C. PRICE    2,232,267
VACUUM SYSTEM REDUCING VALVE FOR PRESSURE AIRCRAFT CABINS
Filed July 30, 1938

Inventor
Nathan C. Price
By Charles L. Reynolds
Attorney

Patented Feb. 18, 1941

2,232,267

UNITED STATES PATENT OFFICE 2,232,267

VACUUM SYSTEM REDUCING VALVE FOR PRESSURE AIRCRAFT CABINS

Nathan C. Price, Seattle, Wash., assignor, by mesne assignments, to Boeing Aircraft Company, Seattle, Wash., a corporation of Washington Application July 30, 1938, Serial No. 222,228

7 Claims. (Cl. 244—1)

There are aboard aircraft certain instruments which are vacuum-operated, as the gyro compass or the gyro of the automatic pilot. Proper operation of such instruments is dependent upon the maintenance of constant speed. These instruments are made and intended for operation at a constant speed which is achieved by a predetermined pressure drop through the instrument or through the vacuum turbine by which the instrument is operated, and their accuracy and dependability can not be relied upon at other speeds, yet upon their accuracy and dependability may depend the safety of the aircraft and of all on board. In open aircraft, or in aircraft where the pressure within the cabin is at all times substantially the same as the ambient external pressure, change in pressure of the atmosphere and of the cabin, wherein are mounted such instruments, has little or no effect upon the operation of the instrument or upon the speed of its turbine. Constant speed can be maintained in such installations by means of an inlet relief line leading to the inlet of the instrument or its turbine, and set at the required pressure differential or pressure drop through the instrument, for instance five inches of mercury. Nothing more is generally required.

With the advent of pressure cabin aircraft, wherein the pressure within the cabin is elevated, above certain altitudes, to a value above the atmospheric pressure surrounding the aircraft, further difficulties arise with the maintenance of proper operation of such vacuum instruments. These difficulties are of two types—first, as cabin pressure increases above atmospheric pressure, the pressure drop through the instrument, regardless of the setting of any inlet regulating valve, tends to increase, and the speed of the instrument's turbine consequently tends to increase. The same is true with decrease of external pressure relative to cabin pressure, since the vacuum pump discharges to the outer air, and as the two are complemental it will be seen that with increase of altitude, above the point where pressure charging of the cabin commences, the interference with proper functioning of the instrument will be progressive and will arise from the two sources. Second, such a pressure cabin is supplied with air under pressure at high altitudes by a blower, the capacity of which is limited, and all leaks or passages by which air may escape from the interior of the cabin to the atmosphere must be kept to a minimum in order not to unduly decrease or tend to decrease the cabin pressure, and to place a heavier load than necessary upon the blower. Especially does such leakage become serious at altitudes such that the cabin pressure differential above atmospheric pressure is but little more than the pressure drop required to operate the instrument.

Accordingly, it is an object of the present invention to provide means capable of incorporation in the vacuum-supplying system of such instrument, by which the pressure drop through the instrument may be maintained constant automatically, regardless of increase of cabin pressure or of decrease in external pressure, or vice versa, to the ultimate end that such vacuum-operated instrument may continue to function as intended at all altitudes and under all pressure conditions, and to the further ultimate end of avoiding undue and unnecessary loss of pressure from the interior of the cabin, when operating under pressure cabin conditions.

It is a further object to provide such a system and valve means for connection in and control of such a system, which will be simple and reliable in operation, and require little or no servicing, and which will operate without attention either under pressure cabin conditions or under conditions wherein the cabin is not supercharged.

With these and other objects in mind, as will appear hereafter, my invention comprises the novel system, and the novel control element in such a system, and also the novel combination of such a system with a cabin supercharging system, all as shown in the accompanying drawing, described in this specification, and more particularly defined by the claims which terminate the same.

In the accompanying drawing I have shown my invention diagrammatically, in so far as the systems are concerned, and have shown the control valve in a form which is at present preferred by me, it being understood that various changes may be made either in the system or in the form, construction and arrangement of the valve, within the scope of my invention as defined by the claims.

In so far as the details of the system for supercharging the cabin are concerned, any suitable system may be employed. That diagrammatically illustrated is disclosed in detail in my applications Serial No. 154,438, filed July 19, 1937, and Serial No. 216,028, filed June 27, 1938, but it is sufficient to note here that air under pressure from a source such as a motor-driven blower is taken from the exterior and delivered under pressure to the interior of the aircraft cabin, and air from the interior is permitted to discharge to the atmosphere, the inlet and outlet being under suitable control to maintain the desired pressure or differential of pressure within the cabin. In accordance with the principles of the system disclosed in my application referred to above the pressure within the cabin is substantially identical with the external pressure up to perhaps 8000 feet altitude, then is maintained substantially constant to about 16,000 feet altitude, at which time there has been developed a differential of internal pressure over external pressure of about 2½ pounds per square inch or 5 inches of mercury, and thereafter, in order that the structure of the aircraft is not unduly stressed by the internal pressure, the attained differential of pressure is maintained from 16,000 feet on upward within the capacity of the blower to maintain this differential. A system having such characteristics may be taken by way of illustration of its effect upon the vacuum system.

Figure 2:
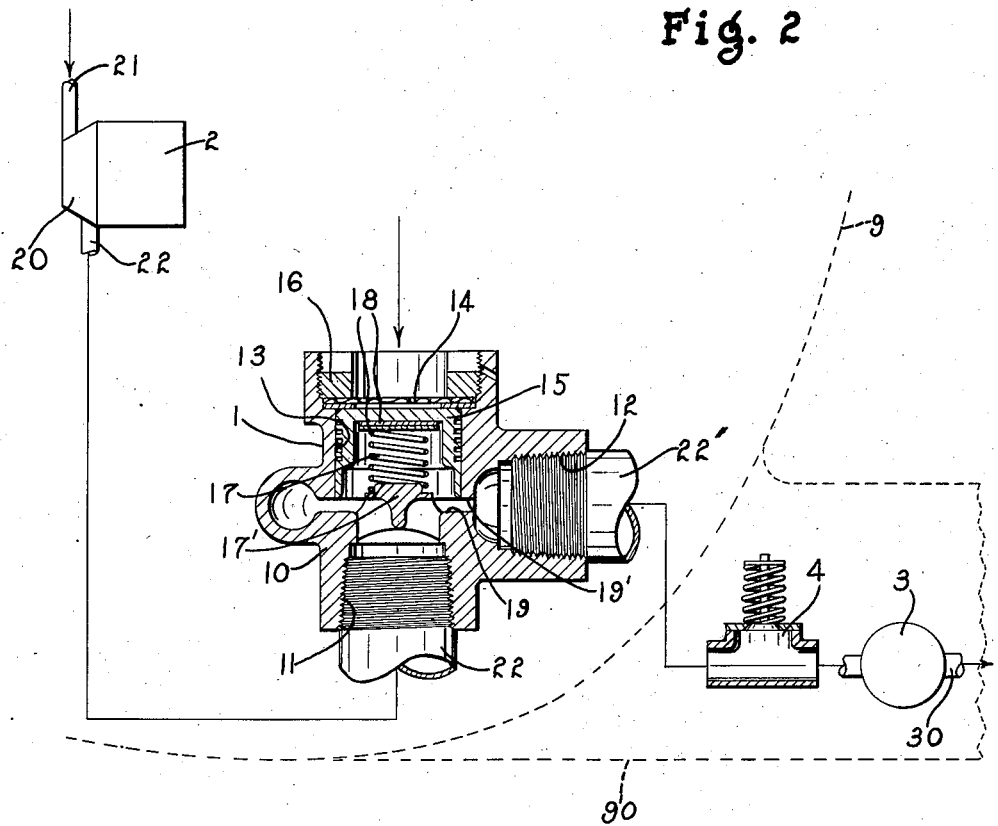
Figure 2 is an enlarged diagram, showing the reducing valve in axial section, the system illustrated including only the vacuum system for the instrument.
Figure 1:
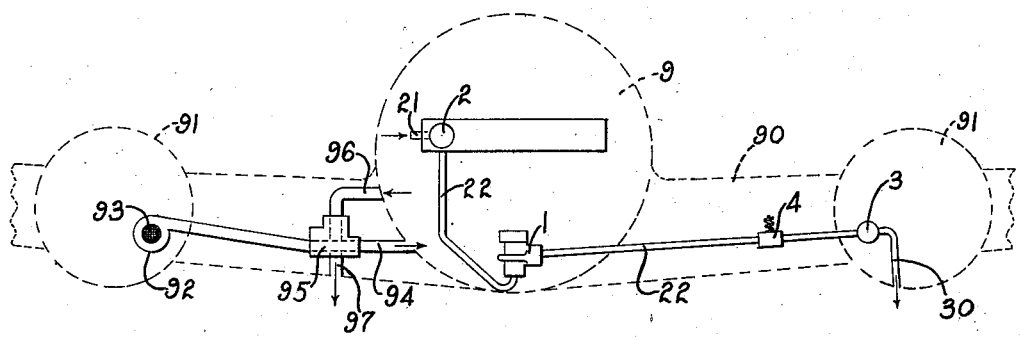
Figure 1 is a diagrammatic elevation of an airplane, incorporating a system for cabin supercharging and embodying the vacuum system for operation of instruments and the reducing valve for control of that vacuum system.

Thus in Figure 1 the sealed cabin 9 is supported by wings 90, and propelled by engines 91, carried outboard upon the wings. Such an engine may be connected to drive a blower 92, supplied with atmospheric air through its inlet 93, and this air is supplied through a conduit 94 to the interior of the cabin 9 through a control device 95. Air is discharged from the cabin through the conduit 96, through the control device 95, and is discharged at 97 to the atmosphere. By means of the control device 95 the cabin pressure is increased over the ambient pressure to the desired value, and is maintained at the desired differential.

Within the cabin 9 is an instrument 2, which may be the gyro of an automatic pilot, driven by the suction turbine 20 having an air inlet 21 open to the pressure within the cabin 9. Suction is created in the line 22, leading from the instrument, by a vacuum pump 3. This may be located adjacent an engine 91, to be driven by the latter, but whether so located and driven, or otherwise, it is provided with a discharge 30 to the atmosphere.

Interposed between the instrument 2 and the vacuum pump 3 is the reducing valve 1. The casing 10 of this valve is provided with a connection at 11 for the line 22 leading from the instrument, and at 12 is provided with a connection to the continuation of the line 22, leading to the pump 3. The portion of line 22 between the instrument and valve 1 is usually or may be wholly within the aircraft cabin, and the valve 1 is so located, but beyond this valve the line usually extends through the cabin wall to the pump which is located outside the cabin.

The casing 10 also has a third opening into its interior—the axial bore 13. This bore, however, is sealed by a diaphragm-like member which is subject to the influence on its outer face of variations in cabin pressure, and which is subject on its inner face to the influence of variations in suction through the line 22. Such a pressure responsive member is illustrated as the plunger 15, covered by the screen 14, which latter is held in place by the clamping ring 16; the ring 16 also limits upward movement of the plunger 15. A spring 17 resists downward or inward movement of the plunger 15, which should be closely fitted within the bore 13, the spring seating upon a bridge 17' within the casing. The force of the spring may be adjusted in various ways, as for instance by the use of one or more shims 18 between the spring 17 and the plunger 15. An actual diaphragm may be employed instead of or in addition to the plunger 15.

Between the inlet 11 and outlet 12 of the valve casing 1 a port is defined by two spaced edges 19 and 19' of the casing. The lower edge of the skirt of the plunger 15 moves across the preferably annular port thus defined, under the influence of pressure changes. If, for example, the pressure within the cabin tends to increase, the increased pressure acting upon the top of the plunger causes it to move downwardly so that its lower edge acts to restrict the effective area of the port, and consequently the effective area of the line 22. Since increase of cabin pressure would tend to produce a greater pressure drop through the instrument, the reduction in the effective area of the line 22 tends to compensate for this tendency, and thereby automatically maintains the pressure drop through the instrument constant. Again, if due to decreased atmospheric pressure, the vacuum pump tends to draw a greater vacuum through the line 22, and thereby to increase the pressure drop through the instrument, the increased suction through the line 22 acts on the inner face of the plunger, tending to draw it downwardly, and to close the port 19, 19', thereby again automatically compensating for this tendency and maintaining the pressure drop through the instrument constant. The reducing valve is so regulated that the plunger 15 normally stands in a mid-position, partially restricting the port area. Consequently, if cabin pressure tends to decrease, or if external pressure tends to increase, thus tending reversely to alter the pressure drop through the instrument, the plunger in either instance is moved upwardly to increase the effective port area, again tending automatically to maintain constant the pressure drop through the instrument.

As a safety means, a spring-loaded valve 4 is provided in the line 22 between the valve 1 and vacuum pump 3, and if the port 19, 19' should be completely closed, the valve 4 will be opened to admit air to the suction side of the vacuum pump. This valve 4, however, is located exteriorly of the pressure cabin, and its opening in no way affects the cabin pressure; indeed, it is not intended that it should open, and its spring is sufficiently strong that it will not open except when the valve 1 is nearly or completely closed to cut off communication between the instrument and the vacuum pump.

Such a system has been tested and has been found to operate thoroughly satisfactorily. If the cabin pressure is maintained constant and the vacuum developed by the vacuum pump is varied from −5.5 inches of mercury to −17.5 inches, and then back again to −5.5 inches, the pressure drop through the instrument has been found to vary only between 5.0 and 5.25 inches of mercury. Again, if the cabin pressure is increased, and the vacuum effect of the pump has been kept constant, with cabin pressures varying from 0 to +10 inches of mercury over and above atmospheric pressure, the pressure drop through the instrument has been found to vary only between 4.95 inches and 4.7 inches. Even where the suction effect of the pump is very low, in the neighborhood of —6.5 inches of mercury, with cabin pressure varying up to +10 inches of mercury, the pressure drop through the instrument is still found to remain substantially constant, the variation being from 5.4 inches to 4.85 inches.

The latter characteristic in particular makes the present system of very great value in pressure cabins wherein a comparatively small differential of pressure is to be maintained at high altitudes between the interior of the cabin and the exterior pressure. If, for instance, the suction effect of the vacuum pump acting through the inlet 21 approaches the pressure differential which is being maintained within the cabin, it is obvious that very serious loss of pressure may result, even through a small opening, and wide fluctuations in the speed of operation of the instrument turbine may result, but where the system is capable of operating, as it has been shown by tests to be, in such manner that even at small pressure differentials the pressure drop across the instrument is maintained, then such a vacuum system may be incorporated in an airplane having a supercharging system maintaining a comparatively small differential, without danger of disturbing the delicate balance of the supercharging and pressure-maintaining system.

The vacuum-operated devices hereinabove particularly referred to are the gyros, but there are other vacuum-operated devices employed which are not strictly instruments, and the present system may be employed in conjunction therewith. Hence, where a vacuum-operated instrument is referred to, it is to be understood that any such vacuum-operated device is included, especially such as would be affected by variation of the effective value of the vacuum. Additional instruments or devices may be connected to branches of the line 22, and such branch lines may be further individually controlled, if desired.

What I claim as my invention is:

1. An aircraft instrument installation in a pressure cabin having means to maintain pressure therein exceeding ambient pressure, comprising a vacuum-operated instrument within and having an inlet open to the cabin, a vacuum pump operatively connected by an air flow passage to said instrument and discharging outside the cabin, and throttling means interposed between the pump and the instrument to maintain a constant differential of pressure effective at the instrument by restricting the opening through such air flow passage in accordance with changes in pressure within the cabin.

2. An aircraft instrument installation in a pressure cabin having means to maintain pressure therein exceeding ambient pressure, comprising a vacuum-operated instrument within and having an inlet open to the cabin, a vacuum pump discharging to the atmosphere, a suction line connecting the pump to the suction side of the instrument, a pressure-regulating throttling valve interposed in said suction line between the instrument and the pump, exposed to pressure within the cabin but inoperative to afford communication between said suction line and the cabin air space other than through an instrument, and responsive both to increase of cabin pressure and to increase of suction in the line to reduce the size of flow passage through the line, thereby to maintain a constant differential of pressure effective at the instrument, regardless of changes in absolute pressure or of relative pressure within and without the cabin.

3. A system for use in aircraft pressure cabins comprising a vacuum-operated instrument having an inlet subject to variations in cabin pressure, a vacuum pump discharging to the atmosphere, a line connecting the suction side of the pump to the instrument, means in said line between the instrument and the pump for regulating the size of flow passage therethrough, and actuating means for said first means operable automatically by and under the influence of change of cabin pressure to actuate said first means for maintaining a constant differential of pressure effective at the instrument, regardless of changes in cabin pressure.

4. A system for use in aircraft pressure cabins comprising a vacuum-operated instrument having an inlet subject to variations in cabin pressure, a vacuum pump discharging exteriorly of the cabin and subject to variations in pressure in such exterior space, a line connecting the suction side of the pump to the instrument, a valve casing interposed in said line, having a passage connected to the instrument and a passage connected to the pump, and having a third passage open to the cabin pressure, a diaphragm element movably received in the third passage, and subject on one side to the cabin pressure and on its other side to the line suction, means operable under the influence of said diaphragm element to restrict the effective area of the line upon increase of cabin pressure or upon increase of suction in the line, to maintain a constant differential of pressure effective at the instrument, and spring means resisting such restriction.

5. A vacuum system reducing valve, for use in the suction line between a vacuum-operated instrument within an aircraft pressure cabin and a vacuum pump discharging to the atmosphere, comprising a casing having spaced means for connection to the instrument and to the suction side of the pump, and having a bore open exteriorly to cabin pressure, a plunger closely fitted and slidable within said bore, a spring urging the plunger outwardly, the casing having within it spaced edges disposed between the instrument connection and the pump connection, and constituting a port, and the plunger having an edge cooperating with and movable past one of said casing edges, in opposition to said spring and under the influence of increase of cabin pressure or of decrease of atmospheric pressure, to restrict the effective area of said port, and thereby to maintain a constant pressure drop through the instrument, regardless of variations of absolute cabin pressure or absolute atmospheric pressure, or of relative pressure.

6. A vacuum-operated aircraft instrument or like installation in a pressure cabin, comprising an instrument having an inlet to the aircraft cabin subject to variations in the cabin pressure, a vacuum pump discharging to atmosphere, and subject to variations in ambient pressure, a suction line connecting the instrument to the suction side of the pump, and means interposed in said line, between the instrument and the pump, including an element exposed to and movable under the influence of and in accordance with increase of cabin pressure or of decrease of atmospheric pressure, tending to increase the pressure drop through the instrument, and a further element actuated by such movement of said first element to decrease the effective area of the line, and vice versa, thereby maintaining a constant pressure drop through the instrument regardless of change of cabin pressure or of atmospheric pressure.

7. A system for use in aircraft pressure cabins comprising a vacuum-operated instrument having an inlet subject to variations in cabin pressure, a vacuum pump discharging exteriorly of the cabin and subject to variations in pressure in such exterior space, a line connecting the suction side of the pump to the instrument, valve means in said line between the instrument and the pump operable to vary the size of opening through the line but inoperable to afford communication between said line and the pressure cabin air space other than through an instrument, and valve actuating means operated automatically in response to changes in differential of pressure between the cabin air pressure and the pressure in said line to move said valve means to vary correspondingly the effective size of its opening, thereby to maintain substantially constant the pressure differential between the inlet and suction sides of the instrument, regardless of changes in absolute pressure or of relative pressure within the cabin and in the exterior space.

NATHAN C. PRICE.